(12) United States Patent
Houck et al.

(10) Patent No.: US 9,428,374 B2
(45) Date of Patent: Aug. 30, 2016

(54) LIQUID VESSEL POURER WITH TIMED ILLUMINATOR FOR MEASURING PURPOSES

(71) Applicants: Nick Houck, Las Vegas, NV (US); Marco LoPiccolo, Las Vegas, NV (US)

(72) Inventors: Nick Houck, Las Vegas, NV (US); Marco LoPiccolo, Las Vegas, NV (US)

(*) Notice: Subject to any disclaimer, the term of this patent is extended or adjusted under 35 U.S.C. 154(b) by 0 days.

(21) Appl. No.: 13/904,841

(22) Filed: May 29, 2013

(65) Prior Publication Data

US 2013/0334246 A1 Dec. 19, 2013

Related U.S. Application Data

(60) Provisional application No. 61/661,587, filed on Jun. 19, 2012.

(51) Int. Cl.
| | |
|---|---|
| *B67D 7/06* | (2010.01) |
| *B67D 3/00* | (2006.01) |
| *G01F 13/00* | (2006.01) |
| *H01H 1/16* | (2006.01) |
| *H01H 35/02* | (2006.01) |

(52) U.S. Cl.
CPC ........... *B67D 3/0041* (2013.01); *B67D 3/0077* (2013.01); *G01F 13/006* (2013.01); *H01H 1/16* (2013.01); *H01H 35/02* (2013.01)

(58) Field of Classification Search
USPC .......................................... 222/23, 113, 641
See application file for complete search history.

(56) References Cited

U.S. PATENT DOCUMENTS

| | | | | | |
|---|---|---|---|---|---|
| 3,257,034 A | * | 6/1966 | Dumm, III | ....................... | 222/36 |
| 3,321,113 A | * | 5/1967 | Conry | ........................... | 222/477 |
| 3,734,417 A | * | 5/1973 | Russell | ................... | A47J 42/38 |
| | | | | | 241/168 |
| 4,111,243 A | * | 9/1978 | Fetterman | ...................... | 141/102 |
| 4,124,146 A | * | 11/1978 | Sealfon | ......................... | 222/641 |
| 4,237,536 A | * | 12/1980 | Enelow et al. | ................ | 705/413 |
| 4,265,370 A | * | 5/1981 | Reilly | ............................. | 222/25 |
| RE31,434 E | * | 11/1983 | Reilly | ............................. | 222/25 |
| 4,736,871 A | * | 4/1988 | Luciani et al. | .................. | 222/25 |
| 5,044,521 A | * | 9/1991 | Peckels | ............................ | 222/23 |
| 5,255,819 A | * | 10/1993 | Peckels | ........................... | 222/1 |
| 5,505,349 A | * | 4/1996 | Peckels | ........................ | 222/641 |
| 5,603,430 A | * | 2/1997 | Loehrke et al. | ................... | 222/1 |
| 5,702,032 A | * | 12/1997 | Loehrke | ......................... | 222/63 |
| 6,036,055 A | * | 3/2000 | Mogadam et al. | ............. | 222/23 |
| 6,409,046 B1 | | 6/2002 | Peckels | | |
| 6,427,871 B1 | * | 8/2002 | Suero | .............................. | 222/36 |
| 6,662,976 B2 | * | 12/2003 | Jensen et al. | .............. | 222/481.5 |
| 7,260,504 B2 | * | 8/2007 | Mogadam | ..................... | 702/186 |
| 7,272,537 B2 | * | 9/2007 | Mogadam | ..................... | 702/186 |

(Continued)

*Primary Examiner* — Donnell Long
(74) *Attorney, Agent, or Firm* — Daniel Boudwin; Global Intellectual Property Agency

(57) ABSTRACT

An illuminating bottle pourer is provided having a pour spout structure and internal electrical components for measuring the amount of dispensed fluid therethrough using a visual counter. The device includes a gravity contact switch and an LED light source that is energized based on a periodic timer circuit and a pulse generator circuit. The gravity switch is closed when the bottle is inverted for pouring, which initiates the timer circuit. The timer circuit triggers the pulse generator on a periodic basis, which energizes the light source to alert the pourer of a given quantity of fluid dispensed. The device allows individual drink makers, bartenders, and establishment owners to precisely control the amount of fluid being dispensed from a bottle, wherein a specified number of light pulses is used to indicate when to stop pouring. A battery switch is further provided to preserve battery life during shipment and between uses.

4 Claims, 5 Drawing Sheets

(56) References Cited

U.S. PATENT DOCUMENTS

| | | |
|---|---|---|
| 7,341,167 B2* | 3/2008 | Mochiachvili et al. ...... 222/113 |
| 7,407,301 B2 | 8/2008 | Zell |
| D587,571 S | 3/2009 | Gonzales, Jr. |
| 8,453,878 B2* | 6/2013 | Palmquist ...................... 222/23 |
| 2005/0167445 A1* | 8/2005 | Mochiachvili et al. ...... 222/113 |
| 2006/0283882 A1 | 12/2006 | Escobar et al. |
| 2008/0114489 A1* | 5/2008 | Mogadam ..................... 700/231 |
| 2008/0272147 A1 | 11/2008 | Buker et al. |
| 2010/0038378 A1* | 2/2010 | Gabler et al. ................... 222/23 |
| 2011/0180563 A1* | 7/2011 | Fitchett et al. .................. 222/1 |
| 2014/0312060 A1* | 10/2014 | Heatherly et al. .............. 222/23 |

* cited by examiner

LIQUID VESSEL POURER WITH TIMED ILLUMINATOR FOR MEASURING PURPOSES

CROSS REFERENCE TO RELATED APPLICATION

This application claims the benefit of U.S. Provisional Application No. 61/661,587 filed on Jun. 19, 2012, entitled "Pour Assist." The above identified patent application is herein incorporated by reference in its entirety to provide continuity of disclosure.

BACKGROUND OF THE INVENTION

1. Field of the Invention

The present invention relates to a fluid dispenser. More specifically, the present invention pertains to a liquor bottle pourer having an illumination means that acts as a visual counter for measuring a predefined quantity of liquid poured from an attached bottle.

Making mixed drinks, including alcoholic and non-alcoholic beverages, requires careful measurement of each ingredient to ensure the proper mixture is created and one ingredient does not overpower another. This makes pouring the correct amount of a particular fluid extremely important for proper drink mixing, cooking, baking, and other activities. The implications of improper measurement include unbalanced food and drink items, and cost considerations of over-dispensed quantities of a particular item.

It is therefore important to be precise when pouring. In the field of alcoholic beverages, the careful server (including professional bartenders and at-home party hosts) may utilize a measuring device to ensure an appropriate amount of liquor or mix has been poured. However, for those who need to work quickly, finding and using a measuring device can waste unnecessary time.

Several systems and techniques exist for measuring dispensed alcohol, including the use of pour spout limiters and the employment of a secondary shot glass as a measuring container. These methods are time consuming to utilize and both are somewhat impractical for home use. Without a clear way to measure, however, a liquid ingredient can easily be over-poured, making a drink or food product too strong or too diluted for the user, and further exposing the business owner to wasted product. A need therefore exists for a simple and effective means of measuring a quantity of dispensed liquid from a larger container or bottle, wherein the device does not interfere with the free pouring of liquid while providing the pourer and indication of the quantity of poured fluid therefrom.

The present invention overcomes the problems inherent in liquid dispensers, wherein a pour spout is provided having a periodically timed light pulse that is continuously triggered on a loop. Each pulse of the light source indicates a given quantity of fluid dispensed through the spout, providing a visual counter for measuring purposes. The device can be used to alert the server that the correct amount of liquor has been poured, helping prevent waste and ensuring an accurate serving. For bartenders, the present invention can save time and money by eliminating the need for extraneous measuring devices and preventing over-pouring.

2. Description of the Prior Art

Devices have been disclosed in the prior art that relate to fluid dispensers. These include devices that have been patented and published in patent application publications. These devices generally relate to liquor bottle pourers that attach to a conventional liquor bottle. The following is a list of devices deemed most relevant to the present disclosure, which are herein described for the purposes of highlighting and differentiating the unique aspects of the present invention, and further highlighting the drawbacks existing in the prior art.

Specifically, Buker, U.S. Patent Publication No. 2008/0272147 discloses a lighted bottle pourer having a standard shaped and sized top spout and lower stopper base. The bottle pourer is inserted into the top of a liquor bottle. Inside the top spout is a circuit board having two small liquid activated leads that stick out into the central pouring tube. The circuit board containing the electronics also has two LEDs that protrude through a reflective ring and a power supply of batteries. When liquid is poured from the bottle, through the spout and out of the top, the liquid activated leads cause the electrical circuit to be energized and light up the LEDs. When the bartender is finished pouring out the liquor, the leads return the electronic circuit to the open position and the LEDs are shut off. While the Buker device discloses a liquor bottle pourer with a light source that illuminates when inverted, the illumination is for ornamental purposes only. The present invention utilizes a flow meter or timer for detecting the quantity of liquor flowing through the pourer, which causes the device to flash or blink in order to notify the user that a predefined quantity of liquid has been dispensed.

Additionally, Escobar, U.S. Patent Publication No. 2006/0283882 discloses a liquid pourer for a container of liquid that includes a circuit actuable in response to inversion of the bottle during pouring to activate one or more LEDs that illuminate the liquid in the container. The light sources are actuated as liquid is being poured from the pourer to illuminate the liquid in the bottle and/or in the outflow. The result is an eye-appealing illumination display that is enhanced by the movement in the liquid. Similar to Buker, the Escobar device is designed for ornamental purposes, and does not utilize a means of detecting the quantity of liquor being dispensed through the bottle pourer. The present invention can be programmed to flash at a predefined interval, such as one flash per quarter ounce of liquor dispensed.

Peckels, U.S. Pat. No. 6,409,046 discloses methods of pouring liquids from bottles, including the steps of providing a pouring head with at least two functionally different modes of pouring, such as electronically timed pouring with automatic shut-off, and free pouring either with or without an annunciator signal, with the annunciator signal preferably being a blinking light. While the '046 device discloses a pouring device that activates a blinking light to notify a user that a quantity of a fluid has been poured, the structure of the device is considerably different than the present invention. The '046 device utilizes a magnetic valve member for pouring, which can include an electronic shut-off, or can blink when pouring is complete. The present invention discloses a conventional liquor bottle pourer that is initiated when inverted, and is designed to blink at a continuous, predefined interval until returned to an upright condition.

Finally, Zell, U.S. Pat. No. 7,407,301 discloses an apparatus for illuminating wine or other liquids, whereby the user can limit the amount of sediment that is allowed to escape from the bottle. The apparatus comprises a collar, an arm, a body, a light source, and a switch. The collar can be hingedly attached to the arm with a spring-loaded hinge. The collar can have a hole large enough to accommodate the neck of a wine or other bottle. The body can be attached to the arm via a retaining member, such that the body is freely positionable along the arm. The light source can be fixedly attached to the body, or hingedly attached thereto. This device provides an illuminating apparatus that is used when decanting a liquid to ensure that sediments suspended therein are retained in the bottle and do not flow into the decanter used to prepare the wine for consumption. The present invention discloses a liquor bottle pourer containing a light source used for measuring the quantity of liquid passing therethrough based on a timed LED pulse.

The devices disclosed in the prior art provide illuminated apparatuses for use when pouring a fluid from a bottle. These devices are generally used for ornamental or decorative purposes. The devices known and disclosed in the prior art, however, do not utilize a counter means that is activated by a gravity switch. The present invention discloses a liquor bottle pourer containing a timer that can be utilized to measure the quantity of liquid being dispensed. Once the defined quantity has been reached, the device pulses the light source to notify the user. If the bottle continues to be inverted, the light source will be pulsed again after a subsequent time interval has passed, wherein the cycle is continuous until the bottle is no longer inverted. A user can count the number of flashes or blinks as he or she pours, which in turn provides notification as to the number of ounces of liquor poured.

In light of the prior art and the disclosed elements of the present invention, it is submitted that the present invention substantially diverges in design elements from the prior art. Consequently, it is clear that that present invention is not described by the art and that a need exists for an illuminated liquor bottle pourer. In this regard, the instant invention substantially fulfills these needs.

SUMMARY OF THE INVENTION

In view of the foregoing disadvantages inherent in the known types of liquid pourers now present in the prior art, the present invention provides a new, illuminated liquid pourer that can be utilized for providing convenience for the user when dispensing a specified amount of liquor from a liquor bottle using a flashing light source as a counter for measurement purposes.

It is therefore an object of the present invention to provide a new and improved liquid bottle pourer device that has all of the advantages of the prior art and none of the disadvantages.

It is another object of the present invention to provide a new and improved liquid bottle pourer that attaches to a conventional liquor bottle that includes a pour measurement indicator that does not interrupt or retard the flow of liquid therethrough.

Another object of the present invention is to provide a new and improved liquid bottle pourer that utilizes a pulsed illumination means for determining the quantity of liquid flowing therethrough, wherein the device is activated based on a gravity switch and the pulsed illumination correlates to a given quantity of fluid that has passed through the spout.

Yet another object of the present invention is to provide a new and improved liquid bottle pourer that has a sealed internal structure and internal circuitry, wherein the overall pourer is constructed to allow for a reasonable replacement cost of the device such that disposal after the battery has been drained is efficient and not a wasteful expenditure.

Another object of the present invention is to provide a new and improved liquid bottle pourer that includes a battery switch for preserving battery life of the unit between uses and during shipment of the pourer prior to use.

A final object of the present invention is to provide a new and improved liquor bottle pourer that may be readily fabricated from materials that permit relative economy and that are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2a shows another cross section view wherein the gravity switch is closed and the device is active while pouring liquid therefrom.

Figure 5B:
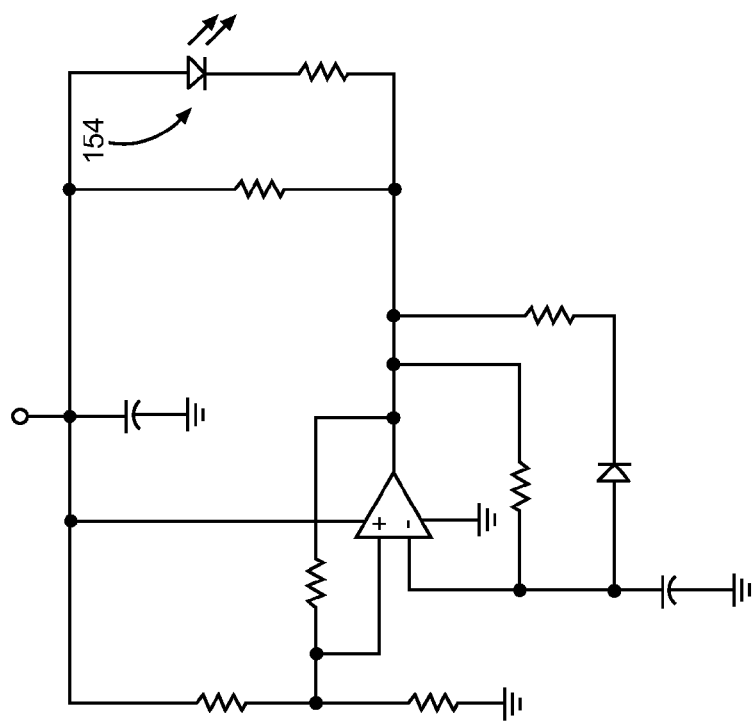
Figure 5C:
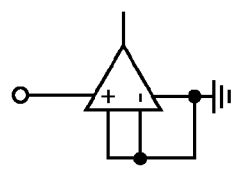
Figure 5A:
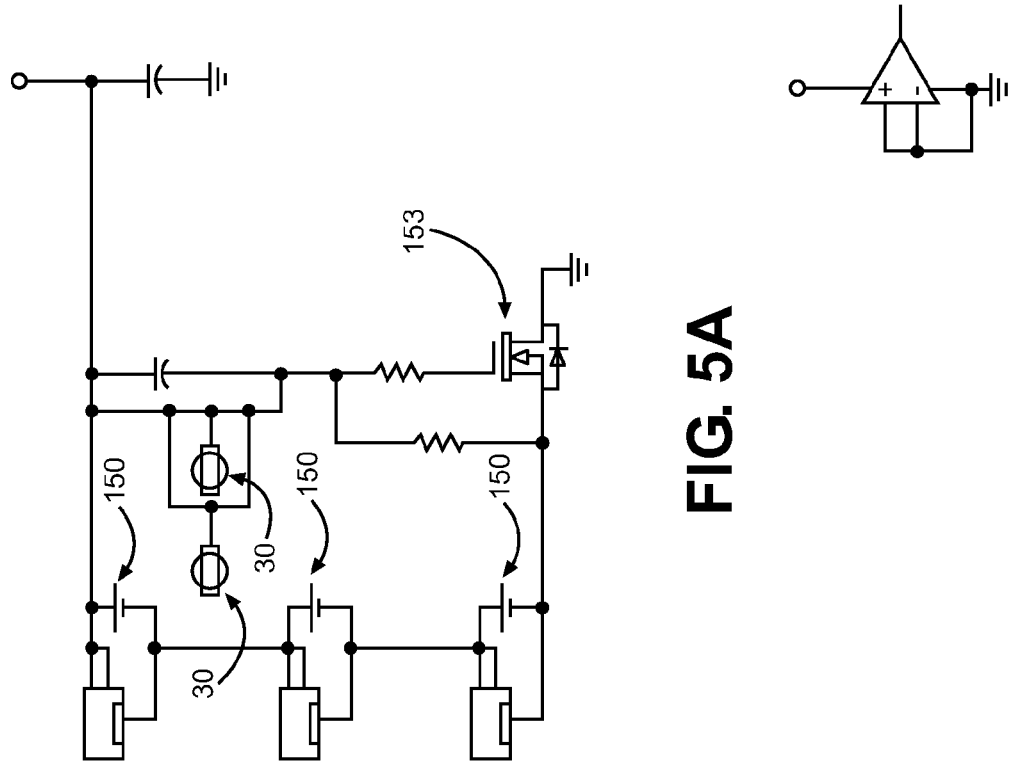

FIG. 5a shows a view of the electrical circuit components.
FIG. 5b shows a view of the electrical circuit components.
FIG. 5c shows a view of the electrical circuit components.

DETAILED DESCRIPTION OF THE INVENTION

Reference is made herein to the attached drawings. Like reference numerals are used throughout the drawings to depict like or similar elements of the liquid bottle pourer. For the purposes of presenting a brief and clear description of the present invention, the preferred embodiment will be discussed as used for measuring a quantity of fluid poured from a liquid bottle using a visual indicator. The figures are intended for representative purposes only and should not be considered to be limiting in any respect.

Figure 1:
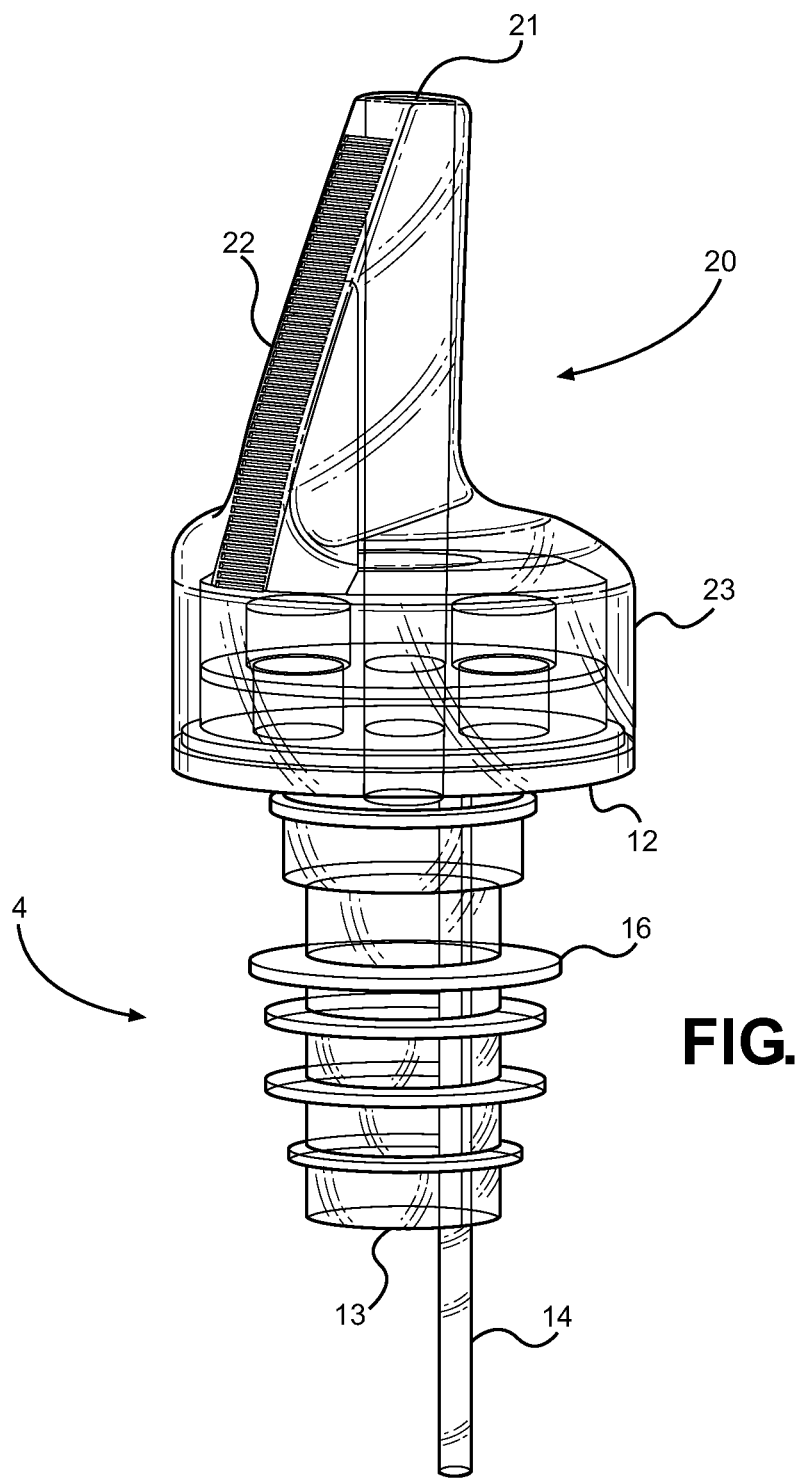
FIG. 1 shows a perspective view of an exemplary embodiment of pourer structure of the present invention.

Referring now to FIG. 1, there is shown a perspective view of an exemplary embodiment of the pourer device of the present invention. The device comprises a largely standard pourer structure, wherein the device includes a pour spout upper 20 and a liquid conduit lower portion 11 that is adapted to be positioned within a bottle open upper. The device includes a base 12 that forms a seal over a container opening, an air relief tube 14 extending through the base 12, a pour spout 21 extending upward from the base 12, and a channel 13 extending through the device for communicating liquid therethrough from a container. The pourer is adapted to fit onto an open bottle top and dispense fluid therefrom. Above the base 12 is an open pourer housing 23 that supports the electronic components within the unit. These include an LED (light emitting diode) light source, a power supply, a timer circuit, a pulse generator circuit, a battery switch, and a gravity switch. The light source is energized on a predetermined time interval, which enables a user to meter the amount of liquid being poured using the light pulses as a counter. The device is preferably designed such that each pulse of the light corresponds to one-quarter ounce of liquor being poured. For each quarter ounce, the light source pulses such that the server can calculate the appropriate amount of liquid that has been dispensed without waste or interference with the pouring activity.

The pourer structure includes an internal channel 13 that extends continuously from the lower end of the device to the upper pour spout end, thereby creating a pathway for a liquid to flow therethrough. As a bottle is inverted, liquid flows through the channel 13, out the pour spout 21 and into another vessel. The relief tube 14 allows air to enter back into the interior of the bottle in order to prevent a vacuum therein that would otherwise create interruptions in the pouring action. The pour spout upper 20 and liquid conduit lower portion 11 resemble pourer fixtures that would be found on a conventional liquor bottle pourer. However, the device includes an internal cavity within the housing 23 that allows supports the working electronics of the device operation.

The pourer lower portion 11 is inserted into an open liquid bottle (i.e. a liquor bottle, etc.) to affect a seal between the device and the container opening. The lower portion 11 includes a plurality of fins 16 extending therefrom, which create a secure connection between the bottle and base. As the base 12 is placed against the top of the bottle, the fins 16 make contact with the bottle interior and flex to allow insertion of the lower portion 11, which acts as a bottle stopper to prevent liquid from escaping therefrom and directing the fluid through the channel 13. The pour spout upper 20 may include an angled tip for allowing pouring without complete inversion or the tip may be straight as desired. The pourer housing 23 is a translucent material such that the LED light source can be housed therewithin and its energized illumination can be readily visualized through the walls of the housing 23. This allows the LED to remain within the interior of the device and not exposed to any liquid, while allowing the LED to be readily visualized during use.

Figure 2:
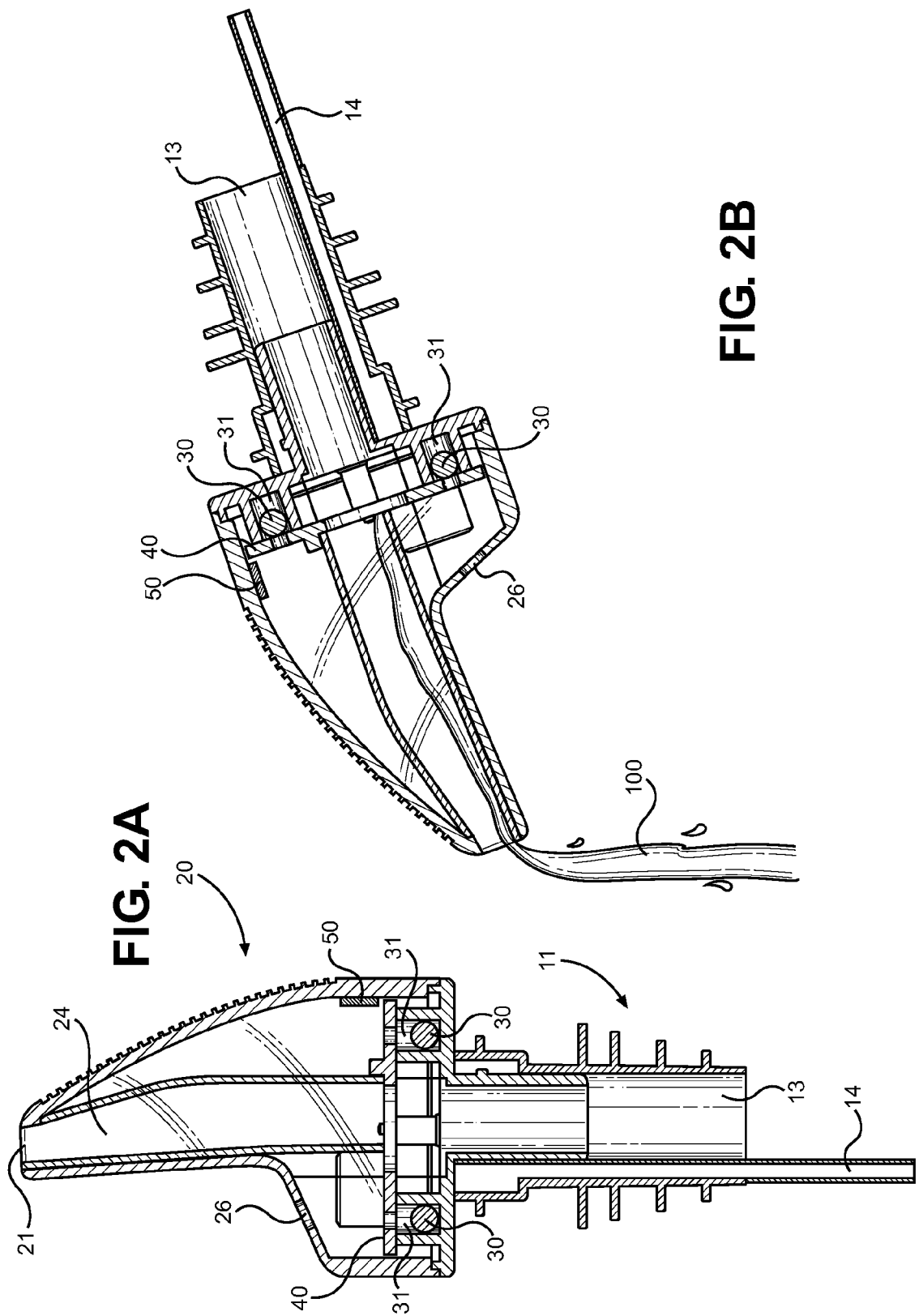
FIG. 2a shows a side cross section view of the exemplary embodiment, wherein the gravity switch and internal structure is visualized.

Referring now to FIGS. 2a and 2b, there are shown cross section views of the device in an upright configuration and an inverted, working state. In FIG. 2a, the pourer is in an upright state with the gravity switch in an open state such that the timer circuit and pulse generator circuit are not receiving power. The gravity switch preferably includes a first and second ball bearing 30 secured within a channel 31, whereby the ball bearings 30 make contact and thus close a switch when inverted and pressed against the upper portion of the ball bearing channel 31. This state affects a closed switch connectivity state that signifies the device has been inverted and the light source can begin pulsing. As seen in FIG. 2b, the ball bearings 30 are against the upper portion of the channel 31, which is aligned with the electronics support shelf 40 within the pourer upper 20.

The ball bearings 30 close the switch when the pourer is tipped below horizontal, as when inverting a bottle of liquid for pouring purposes. The switch closes and initiates the periodic timer circuit, which in turn pulses the pulse generator that energizes the LED light source 50 within the pourer. Liquid 100 is free to flow through the pourer channel 13, through an internal conduit 24 within the pourer and through the open pour spout 21 when dispensing. A relief hole 26 allows air to enter the relief tube 14, filling the container with air to prevent a vacuum as liquid exits. After the specified amount of liquid 100 is dispensed, the bottle can be returned to an upright configuration. When the pourer is righted to an upstanding position, the bearings 30 move away from the switch and thus deactivate the timer and the LED pulsing.

Figure 3:
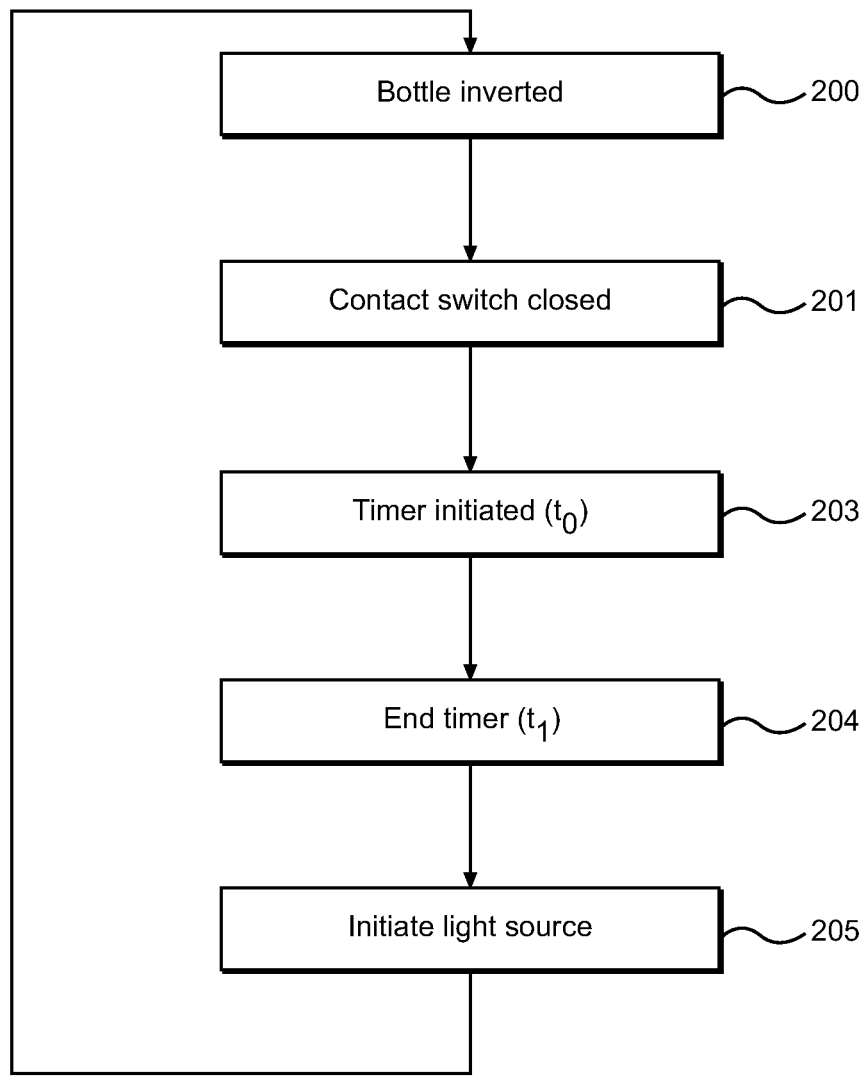
FIG. 3 shows a flowchart of the device operation using the illumination means, gravity switch, timer circuit, and pulse generator circuit.

Referring now to FIG. 3, there is shown a flowchart of the device operation and the operation of the electrical components of the device. The method of notifying a user that a predefined quantity of a liquid has been poured comprises detecting the bottle has been inverted 200 using a gravity switch 201, activating 203 a periodic timer that generates a timed pulse, generating a pulse 204 to power the light source based on the periodic timer pulse, which thereafter causing the light source to energize and alert a user that a predefined quantity of a liquid has been dispensed. When the bottle is placed in an upright position, the sensor of the gravity switch outputs an inactive signal that ceases the LED illumination.

In the preferred embodiment, the device is designed to measure one-quarter ounce of liquid based on timing and the flow rate through the device. This measurement increment is a common measurement and can be used to determine when to stop pouring for mixed drinks and shots of alcohol. The light source is continually pulsed based on the designed timer as long as the sensor for the gravity switch indicates the device is in an inverted position. When upright, an inactive signal is outputted from the gravity switch sensor. To completely deactivate the system, a battery switch is provided. Therefore, the device remains active and vigilant unless the battery switch is opened.

Figure 4:
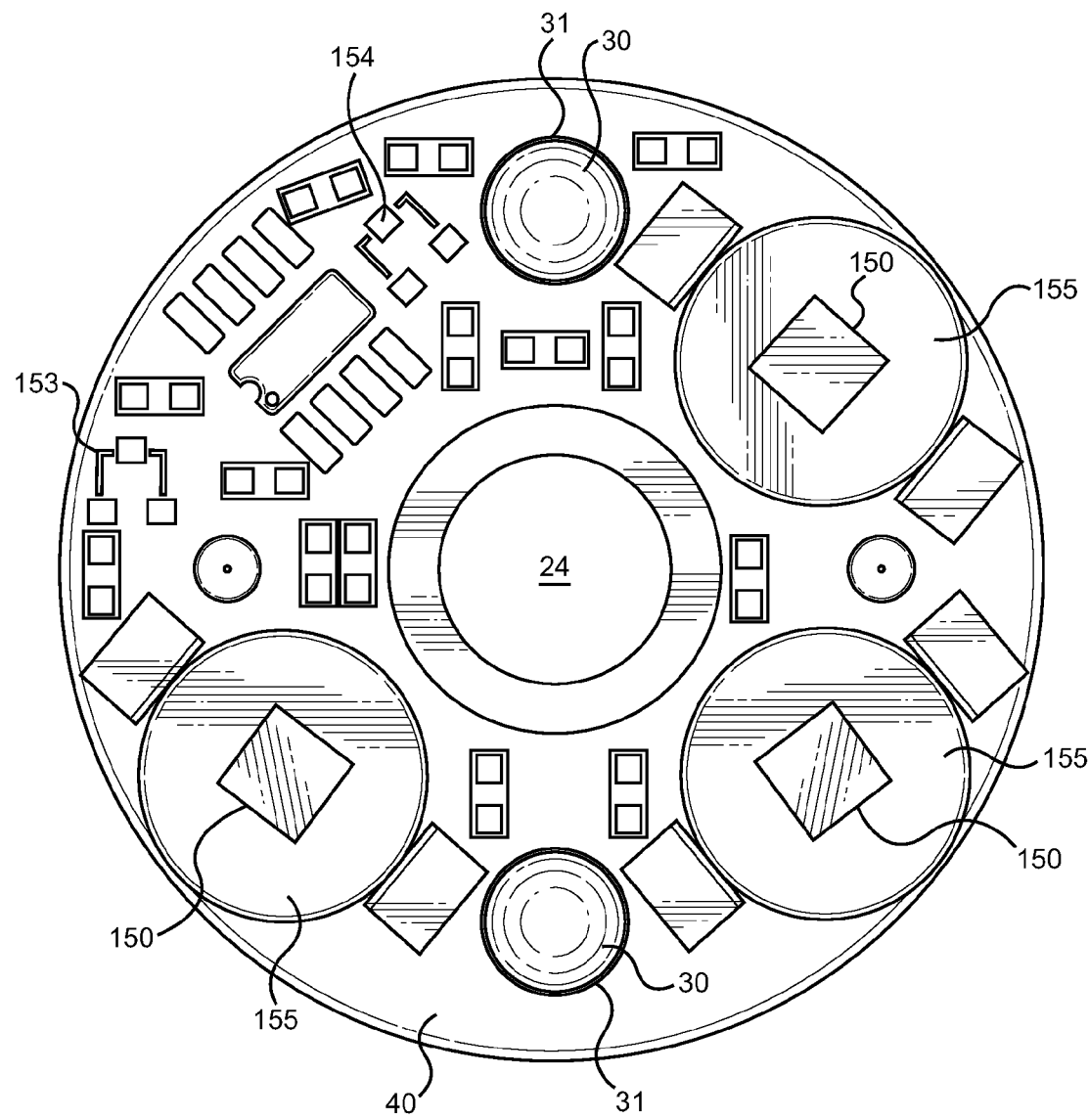
FIG. 4 shows an overhead view of the electrical components within the interior of the pourer, whereby the components are supported on a shelf therewithin.

Referring now to FIG. 4, there is shown an overhead view of the electrical component support shelf 40 within the interior of the pourer device. The shelf 40 includes a central aperture to accept the pour spout channel 24 therethrough for the communication of fluid, and a planar surface for supporting the circuit board supporting the various circuits of the device. The first and second ball bearing 30 and ball bearing channels 30 are positioned opposite of one another along the shelf 40, as the two assemblies provide redundant gravity sensors that can individually allow for the timer to initiate if one of the ball bearings 31 is stuck or does not fully make contact with the switch sensor. Powering the electrical components are three batteries 150, which supply power when the power switch is closed.

Referring now to FIGS. 4 through 5c, the electrical components are highlighted and an exemplary embodiment of the circuit design is shown. The circuit of FIGS. 5a, 5b, and 5c comprises six primary components: at least one battery power supply 150, a battery switch 153, at least one gravity switch 30, a periodic timer, a pulse generator, and a light emitting diode (LED) light source 154. The battery is preferably a coin type AG5 low profile non-rechargeable battery (4.5V overall), while the gravity switch is a mechanical assembly comprising a ball bearing, bearing cylinder, and contact sensor. In an exemplary embodiment, the periodic timer is set to pulse every 390 milliseconds, which activates the pulse generator. The pulse generator outputs a 50 millisecond pulse to the LED 154. The timing of each circuit is dependent on the size of the pourer, and is designed to generate an LED flash after the pourer has dispensed a quarter ounce of fluid therethrough. In the exemplary embodiment of the device, Overall, the present invention provides a device that assists both professional bartenders and casual users with dispensing a predefined quantity of liquor from a liquor bottle. This enables a user to meter the amount of liquor being poured, as each blink corresponds to one-quarter ounce of liquor being poured. For bartenders, the device saves both time and money by preventing over-pouring and eliminating the need for extraneous measuring devices. The device can be secured to a conventional liquor bottle, used to dispense a quantity of liquor, and moved to a different bottle as desired. The device can also reassure a customer that the appropriate amount of liquor has been poured in his or her drink, as one can count the number of ounces being poured based on the number of times the light source flashes. In addition to its functional purpose, the present invention provides an aesthetically pleasing bottle pourer that can be constructed in a variety of colors, and can include various designs thereon.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A liquid pourer, comprising:
   a pour spout and upper conduit portion;
   said pour spout comprising a pourer housing, a pour spout, and a base;
   said conduit lower portion comprising a fluid channel that is adapted to be placed within a bottle opening for communication of fluid therethrough, into an internal conduit within said pourer housing, and through said pour spout;
   a battery power source;
   a first ball bearing slidably supported within a first ball bearing channel;
   a second ball bearing slidably supported within a second ball bearing channel;
   wherein the ball bearing channel and the second ball bearing channel are positioned oppositely along a shelf of the pourer housing;
   a periodic timer circuit adapted to generate a pulse after a time interval;
   a pulse generator circuit adapted to pulse based on said periodic timer circuit's pulse;
   a light source adapted to energize based on said pulse generator pulse;
   wherein the ball bearing is configured to effect a closed switch connectivity state that activates the periodic timer when the liquid pourer is tipped below a horizontal level;
   said fluid channel and said pour spout providing a linear fluid flow path.

2. The device of claim 1, further comprising a relief tube extending through said conduit lower portion and a relief hole in said pour spout upper, said relief hole adapted to allow communication of air into said relief tube, wherein said relief tube projects beyond said conduit lower portion.

3. The device of claim 1, wherein said light source is correlated to energize for every quarter ounce of fluid communicated through said pour spout after inversion of said pourer.

4. The device of claim 1, wherein said light source is at least one light emitting diode.

* * * * *